United States Patent [19]
Evans
[11] Patent Number: 4,550,694
[45] Date of Patent: Nov. 5, 1985

[54] PROCESS AND APPARATUS FOR COOLING INTERNAL COMBUSTION ENGINES

[75] Inventor: John W. Evans, Sharon, Conn.
[73] Assignee: Evans Cooling Associates, Sharon, Conn.

[21] Appl. No.: 609,575
[22] Filed: May 11, 1984
[51] Int. Cl.[4] ........................... F01P 3/22; C09K 5/04
[52] U.S. Cl. ................................ 123/41.02; 123/41.2; 123/41.27; 252/68; 252/75
[58] Field of Search ............... 123/41.42, 41.01, 41.18, 123/41.2, 41.21, 41.24, 41.27, 41.02; 165/104.19, 104.21, 104.22, 104.27, 104.28; 252/68, 73, 75, 78.1

[56] References Cited

U.S. PATENT DOCUMENTS

| | | | |
|---|---|---|---|
| 1,338,722 | 5/1920 | Fekete | 123/41.18 |
| 1,432,518 | 10/1922 | Armstrong | 123/41.1 |
| 1,630,070 | 5/1927 | Muir | 123/41.25 |
| 1,658,934 | 2/1928 | Muir | 123/41.25 |
| 1,789,540 | 1/1931 | Brubaker | 123/41.72 |
| 1,806,382 | 5/1931 | Barlow | 123/41.54 |
| 2,353,966 | 7/1944 | Newcombe | 123/41.19 |
| 2,403,218 | 7/1946 | Hanners | 123/41.26 |
| 3,082,753 | 3/1963 | Bullard | 123/41.24 |
| 3,102,516 | 9/1963 | Gist et al. | 123/41.42 |
| 3,384,304 | 5/1968 | Barlow | 237/8 |
| 3,731,660 | 5/1973 | Leffert | 123/41.42 |
| 4,389,371 | 6/1983 | Wilson et al. | 252/75 |
| 4,404,113 | 9/1983 | Peters et al. | 252/75 |
| 4,637,699 | 1/1983 | Evans | 123/41.23 |

FOREIGN PATENT DOCUMENTS 480461 2/1938 United Kingdom .

OTHER PUBLICATIONS

Gibson, A. H., "Aero-Engine Efficiencies," Transactions of the Royal Aeronautical Society, No. 3, 1920; pp. 1-36.
Frank, G. W., "High-Temperature Liquid Cooling," SAE Journal, vol. 25, Oct. 1929, pp. 329-340.
Wood, H., "Liquid Cooled Aero Engines," SAE Journal, vol. 39, Jul. 1936, pp. 267-287.

*Primary Examiner*—William A. Cuchlinski, Jr.
*Attorney, Agent, or Firm*—Brumbaugh, Graves, Donohue & Raymond

[57] ABSTRACT

A cooling process for an internal combustion engine comprises the steps of mechanically pumping a boilable liquid coolant having a saturation temperature above about 132° C. at atmospheric pressure from the engine coolant jacket through a radiator and back to the coolant jacket, continuously removing by substantially unrestricted convection through at least one outlet in the highest region of the head portion of the coolant jacket substantially all gases other than those that condense in the coolant jacket, conducting gases from the outlet to a condenser, and returning condensate from the condenser to the coolant jacket. Cooling apparatus comprises a liquid cooling circuit and a vapor discharge and condensation circuit adapted to carry out the process.

21 Claims, 2 Drawing Figures

PROCESS AND APPARATUS FOR COOLING INTERNAL COMBUSTION ENGINES

FIELD OF THE INVENTION

The present invention relates to a process for cooling internal combustion engines and to apparatus for carrying out the process.

BACKGROUND OF THE INVENTION

Circulating Liquid Cooling Systems

The vast majority of all positive displacement internal combustion engines presently operating throughout the world are cooled by pumping a water-based coolant in a closed circuit comprising cooling jackets around the combustion chambers and a heat exchanger (radiator). Some engines, mostly low-horsepower engines and some aircraft engines, are air-cooled, but air-cooling is poorly suited to large stationary and ground vehicle engines because it is impossible to maintain the reasonably stable temperatures that are required to ensure long engine life and good performance under various ambient conditions and loads.

Virtually all liquid-cooled engines use water or a solution of an antifreeze, such as ethylene glycol, in water. The use of water as a coolant has many advantages, such as its existence as a natural substance in plentiful supply in most parts of the world, lack of flammability, and excellent heat transfer characteristics. Its advantages far outweigh its disadvantages of causing corrosion and leaving deposits of impurities, both of which are largely overcome by additives in antifreezes in any case.

Over perhaps the last twenty years or so, and especially in recent years, there has been some increase in the operating temperatures of engine cooling systems, which is made possible by increasing the pressure of the system and using a higher temperature thermostat, in order to reduce the rate of heat rejection and improve the efficiency of the engine. Higher coolant temperatures improve efficiency not only by using more heat output in the thermal cycle rather than rejecting it but also by reducing quenching of the flame by keeping the combustion chamber walls hotter. On the other hand, higher temperatures and pressures in the cooling system cause maintenance problems, such as hose and coupling leaks and failures, and operating problems, such as a greater tendency to allow overheating of the engine, engine knocking, undesirably high oil temperatures and increased emissions of oxides of nitrogen ($NO_x$).

Despite the recognized effectiveness of circulating liquid cooling there are also recognized shortcomings. It is necessary to provide a large volume of coolant and a heat exchanger large enough to handle the peak thermal load that the system will encounter. Otherwise, the engine will overheat from time to time and might be seriously damaged. These requirements add weight and expense to the system. The coolant is circulated from the top of the coolant jacket to the heat exchanger and returned to the lower part of the coolant jacket. This tends to create a fairly steep temperature gradient along the cylinder walls, which causes the cylinder diameter to vary from top to bottom. The rings have to expand and contract, which causes wear of the rings and ring lands. The lower portions of the cylinder walls are often at a temperature below the dew point of the water vapor present. Water vapor condensate mixed into engine lubrication oil will contaminate the oil and cause the formation of acids and sludge.

There are reports in the technical literature of early experiments with high temperature liquid coolants, such as ethylene glycol and aniline, used in pumped liquid systems (see Gibson, A. H., "Aero-Engine Efficiencies", *Transactions of the Royal Aeronautical Society,* No. 3, 1920; Frank, G. W., "High-Temperature Liquid Cooling", *SAE Journal,* Vol. 25, October, 1929, pp. 329–340; and Wood, H., "Liquid Cooled Aero Engines", *SAE Journal,* Vol. 39, July, 1936, pp. 267–287). Problems cited in these reports include instances of head temperatures running well above desired levels, distortion, hot spots, and leakage of coolant.

Young, infra, p. 635, discusses (writing in 1948) raising automotive engine coolant temperatures from, the then state-of-the-art, 60° C. to 82° C., to higher levels. He cautiously suggests that unpressurized ethylene glycol could be utilized as a coolant that would operate at a temperature higher than the boiling point of water but then observes (p. 635) that heat dissipation may decrease and "hot spots could also be expected in the average engine." Young concludes his discussion with suggestions of pressurized liquid systems using water-antifreeze solutions. The current state-of-the-art coincides with Young's concluding suggestions.

Bailey British Pat. No. 480,461 (1938) proposes a pressurized circulating water cooling system for aircraft engines supplemented by a condenser for collecting the steam generated under abnormally high loads, condensing the steam, and storing the condensate. A system of valves prevents return of the condensate until the engine is stopped and cooled down. The steam leaves the coolant jacket entrained within the pumped liquid flow and requires a "header tank" to separate the vapor from the liquid. As the egress of steam from the coolant jacket is dependent upon the rate of liquid coolant flow, a significant portion of the coolant jacket, particularly adjacent to combustion and exhaust areas, will become filled with vapor if the rate of vapor production becomes a substantial percentage of the rate of liquid coolant flow.

A gasoline-fueled automobile engine according to current technology utilizing a standard liquid cooling system, that pressurizes a coolant consisting of water and ethylene glycol in a 50/50 solution to a high pressure, say of the order of 172 KPa gauge (25 psig), and equipped with a thermostatic valve operating at 104° C., appears to reach the upper limit of bulk coolant temperature that can be tolerated without unacceptable knock, thermal stress cracking of the engine head and other adverse effects of uneven and excessive engine temperatures. Indeed, unacceptable knock is frequently encountered after a few thousand kilometers of operation when carbon deposits that have built up on the combustion chamber domes begin to provide sites for glowing hot spots that cause preignition and detonation.

Ignition occurs in diesel engines when fuel is injected into a combustion chamber; thus preignition due to hot spots is not a problem as it is in gasoline spark-ignition engines. Nonetheless, uneven and excessive temperatures in a diesel engine, typical problems for an engine cooled by a conventional liquid cooling system, cause distortion and failure of components as well as increased engine emissions.

Vapor Cooling Systems

In the early days of the internal combustion engine vapor cooling (also called ebullient or evaporative cooling) was quite common. In a vapor cooling system the coolant is allowed to boil in the coolant jackets and is conducted to a condenser in the vapor phase, usually along with some water. The condensed vapor is returned to the engine, either by gravity or by pumping. Vapor cooling systems fell out of use in automotive applications about 1930, probably because of the introduction of thermostatic control into liquid systems which made it possible to provide reasonably stable engine temperatures under various conditions. Moreover, vapor cooling systems were subject to being overloaded with vapor, and the loss of coolant through pressure relief valves was excessive.

Over the past 50 or 60 years, various vapor cooling systems have been proposed in the lay, technical and patent literature, but none has ever achieved any measurable commericial success, with the possible exception of systems for stationary engines, such as engines used in the drilling industry. Work on vapor cooling has, nonetheless, been pursued because it offers a number of advantages. The main advantages are:

(1) The heat transfer coefficients for boiling and condensing the coolant are about an order of magnitude greater than the coefficient for raising or lowering the temperature of a liquid coolant.
(2) Boiling occurs at a constant temperature (assuming constant pressure), so the temperatures along the swept areas of the cylinder walls remain more nearly even, which reduces ring and ring-land wear as the rings work in and out.
(3) Implicit in a more even temperature is a generally higher temperature level in the lower portions of the cylinder walls, which improves fuel economy due to reduced heat injection, flame quenching and friction.
(4) The amount of coolant for a vapor system is considerably less than in a liquid system, which reduces weight.
(5) A low pressure vapor system can have lighter, less expensive hoses and couplings and is less prone to leaks and failures than a liquid system.

Examples of proposed vapor cooling systems are found in Muir U.S. Pat. No. 1,658,934 (1928), Muir U.S. Pat. No. 1,630,070 (1927), Armstrong U.S. Pat. No. 1,432,518 (1922), Barlow U.S. Pat. No. 3,384,304 (1968), Leffert U.S. Pat. No. 3,731,660 (1973), Evans (the inventor of the present invention) U.S. Pat. No. 4,367,699 (1983) and Young, F. M., "High Temperature Cooling Systems," *SAE Quarterly Transactions,* Vol. 2, No. 4, October, 1948.

With one exception, all prior art vapor cooling systems that the inventor of the present invention is aware of have used water or water-antifreeze solutions that contain large percentages of water as the coolant, and all prior art systems are believed to be impractical because under high ambient temperatures and either heavy engine loads or prolonged idling, the volume of vapor produced by the engine can not be handled by a condenser of practical size. Hence, some vapor will inevitably be vented.

More importantly, when the ambient and operating conditions are such that large amounts of vapor are generated in the engine, the effectiveness of the cooling system is greatly reduced; large amounts of vapor are present in the engine coolant jackets and displace liquid phase coolant that would otherwise be available to cool the engine. Vapor blanketing and film boiling occur in the high temperature areas, especially over the combustion chamber domes and around exhaust runners, the conduits that contain the passageways between combustion chambers and exhaust ports. The blanket of vapor present with film-boiling greatly reduces the heat transfer from the metal to the coolant; hot spots develop, and severe knocking ensues. Large amounts of vapor enter the head coolant jacket from the block coolant jacket, and the amount of liquid coolant coexisting with the vapor in the head is reduced. If the engine is not shut down, possibly damaging overheating can occur. In all likelihood once venting of coolant begins, it will continue for a considerable time, even after the engine is stopped, and the loss of coolant will be so great that the engine cannot be run until after the coolant supply is replenished.

Boiling within the coolant jacket is by no means restricted to boiling liquid cooling systems. Peak flame temperatures within engine combustion chambers are on the order of 1093° C. (2000° F.), and typical exhaust gas temperatures as as high as 482° C. (900° F.) for diesel engines and 760° C. (1400° F.) for gasoline engines. The temperatures of the surfaces of the coolant jacket adjacent to combustion chamber domes and exhaust runners are high enough to cause localized boiling of coolant, even in a circulating liquid cooling system where the bulk of the coolant liquid is maintained at a temperature considerably below the saturation temperature of the coolant. The heat transfer within any liquid is not good enough to prevent a temperature gradient across the liquid from the area of such proximity to areas of the coolant where the coolant is at a lower temperature. The liquid coolant closest to the hot metal walls of the jacket is at the saturation temperature and is in the process of being vaporized.

In Evans U.S. Pat. No. 4,367,699 it is proposed to use "pure ethylene" as a coolant for vapor phase cooling of a diesel cycle engine. As far as the present inventor is aware, that is the first time that a high saturation temperature, low water content coolant was proposed to the public for use in a vapor cooling system. This information first became publicly known on Dec. 16, 1981, through publication of Evans' Published E.P.C. Application No. 0041853. It is believed, however, that non-boiling coolants (coolants that have saturation temperatures so high thay they will not boil in an engine) have been proposed and used, at least experimentally, in diesel engines having circulating liquid cooling systems. It is well known that diesel engines can run properly and advantageously at higher temperatures than gasoline engines.

The Evans patent, in accord with all vapor cooling art prior to it, recommends substantially water-based coolants that boil near traditional coolant temperatures for gasoline engines and, in so doing, carries forward the knowledge derived over the long history of gasoline fueled internal combustion engines and the universal practice today, that water (with antifreeze for protection from freezing, deposits and corrosion) is the only acceptable coolant for gasoline engines.

Control of Vapor in a Cooling System

In Evans' PCT application No. US83/01775 entitled "Boiling Liquid Cooling System for Internal Combustion Engines" and filed November, 1983, there is disclosed a boiling liquid cooling system ("boiling liquid"

is deemed to be an apt term for systems also called "vapor" or "ebullient" or "evaporative" in the art) that employs organic liquid coolant substances having saturation temperatures above, and generally considerably above, 132° C. (270° F.). The threshold temperature was selected from observations that the coolant in the block coolant jacket is normally below that level. Therefore, a coolant substance with a saturation temperature above the threshold will seldom boil in the block, and no significant amount of coolant vapor will enter the head coolant jacket from the block coolant jacket. The head coolant jacket ceases to be a conduit for vapor to flow to the condenser from the block coolant jacket. The resulting reduction of coolant vapor in the head coolant jacket increases the ratio of liquid to vapor within the cylinder head jacket.

The use of an organic coolant substance having a high saturation temperature is also beneficial in increasing the rate of heat transfer from the coolant jacket to the coolant by reducing the condition of vapor blanketing at interior surfaces of the coolant jacket. Vapor blanketing occurs when the temperature of a surface exceeds the saturation temperature of liquid in contact with it by an amount called the critical superheat, or the critical temperature difference. The critical temperature difference for an organic liquid is on the order of 50° C., or about twice that of water. In addition, the higher the saturation temperature, the less likely it is that the critical temperature difference will be reached. The boiling of liquid by the transfer of heat from a hot surface to liquid through a vapor blanket is termed film boiling. Under conditions of film boiling the temperature of the surfaces of the coolant jacket are not limited to a level close to the saturation temperature of the coolant.

In selecting coolants, the heat of vaporization, or the amount of heat contained in each gram of liquid vaporized, is less important than the molar heat of vaporization, or the amount of heat contained in each mole of vapor produced. The higher the molar heat of vaporization, the fewer moles of vapor generated by any given amount of heat. Even though water has a heat of vaporization far greater than any organic liquid, many organic liquids exhibit molar heats of vaporization substantially higher than that of water.

If it were possible to use high saturation temperature coolants that are entirely free of air and water or other volatile constituents or impurities, the gas existing within the coolant jacket would be vapor that would be entirely condensable at a high temperature. By maintaining the bulk coolant temperature in the coolant jacket at a level lower than the saturation temperature of the coolant in a location through which all of the vapor has to pass, all of the vapor within the coolant jacket would condense without the necessity of moving the vapor to a heat exchanger external to the coolant jacket for condensation. Unfortunately, this is not a practical possibility. Coolants miscible with water, those that readily become solutions with water, are hygroscopic and directly absorb water from ambient air that is in contact with them.

While the percentage of water in a given solution may appear to be insignificant, the effects of the water, even small amounts, are not. For example, a liter of a highly concentrated solution of propylene glycol with water that is ninety-seven percent (97%) by weight propylene glycol, contains approximately 30 grams of water, or about 1.67 moles of water. This amount of water vaporized at atmospheric pressure will occupy 37.4 liters of volume. Whenever water vapor is a constituent of a mixture with vapor of a second substance, the vapor of the second substance cannot be completely condensed until the temperature of the vapor mixture is lowered to a temperature below the saturation temperature of water for the pressure of the system. Even liquid generally considered immiscible with water usually contains small quantities of water. A liter of liquid that contains water only to the extent of one half of one percent has the potential of producing 6.2 liters of vapor that will not condense at or above the temperature of the boiling point of water. In addition to the amounts of water that a coolant may contain when new, plus any water that enters the coolant by absorption from ambient air, water may be added inadvertently to a cooling system during servicing or purposely in an emergency situation. Another way that water can enter the cooling system is by leakage of combustion gases into the coolant jacket.

There are substantial benefits in maintaining coolant temperatures well above 100° C. By operating with higher temperatures in the bores there is less heat rejected from the engine and greater engine efficiency. Emissions of carbon monoxide (CO) and of hydrocarbons (HC) are reduced because there is a more complete burning of fuel. In diesel engines higher cylinder bore temperatures also lower particulate emissions. Current state-of-the-art circulating liquid coolng systems can partially achieve these benefits only by resorting to the use of very high cooling system pressures.

The boiling liquid cooling process of the Evans PCT application (referred to above) relies substantially entirely on a condenser (or condensers) for extraction of heat from the coolant. The condenser, of course, has to have enough heat transfer capacity to handle all of the heat rejected from the engine through the coolant system under the severest loads and ambient conditions encountered by the engine, which means that it must be sized for the most extreme conditions. Under average conditions, only a small portion of the condenser is utilized, and there is considerable unused capacity. A condenser for a system according to the Evans PCT application can easily be constructed and installed for a small automobile engine, say 1600 cc, but as the condenser must be increased in size to fulfill the cooling requirements of larger engines, the size of the condenser may make an installation less practical for a large engine. The system of the Evans PCT application also tends to hold a given bulk temperature of the engine that is dependent to a considerable extent upon the saturation temperature of the coolant. With the practical high saturation temperature coolants that are presently available, it may be desirable to maintain the bulk coolant temperature at a level lower and perhaps considerably lower than the saturation temperature of the coolant in order to optimize engines performance and increase durability.

SUMMARY OF THE INVENTION

One object of the present invention is to limit the temperature at every location within an engine coolant jacket to a level that corresponds to the saturation temperature of the coolant. A second object is to enable the coolant temperature in the coolant jacket in the swept volume, or bore areas, of an engine to be maintained above the saturation temperature of water but below the saturation temperature of the coolant at any system pressure. A third object is to minimize the presence of vapor, from localized boiling, in areas of the coolant jacket adjacent to the combustion chamber domes and exhaust runners, keeping the major part of the engine coolant jacket in these areas filled with coolant in the liquid state at all times. A fourth object is to achieve adequate control of coolant jacket temperatures while minimizing the size of cooling system heat exchangers. Yet another objective is to minimize the loss of coolant from the system.

The above objects are attained, in accordance with the present invention, by utilizing a boiling liquid coolant, promoting the condensation of coolant vapor within the coolant jacket, providing an unobstructed route for gases uncondensed in the coolant jacket to move by convection to a condenser means equipped with means for returning condensate to the coolant jacket, removing heat from liquid phase coolant by pumped circulation through a heat exchanger, enhancing the heat transfer from the liquid coolant to ambient air by virtue of a large difference in temperature, retarding the transfer of gases between the condenser means and ambient air and by exposing ambient air only to coolant that has a vapor pressure substantially lower than that of water.

More particularly, a process, in accordance with the present invention, comprises the steps of mechanically pumping a boilable liquid coolant having a saturation temperature above about 132° C. at atmospheric pressure from the engine coolant jacket through a heat exchanger and back to the coolant jacket to provide heat rejection in the heat exchanger such that no vapor is formed in the liquid outside the coolant jacket as a result of the pressure drop induced by the pump and such that the temperature of the coolant within portions of the head portion of the coolant jacket that are in elevation above locations adjacent to combustion chamber domes and exhaust runners is maintained below the saturation temperature of the coolant at the system pressure, continuously removing from the engine coolant jacket by substantially unrestricted convection through at least one outlet leading from the highest region in the head portion of the coolant jacket substantially all gases other than gases that condense within the coolant in the jacket, including vapor formed by localized boiling of the liquid coolant in areas adjacent to combustion chamber domes and exhaust runners, whereby the major part of the head portion of the engine coolant jacket is kept filled with coolant in the liquid state at all times, conducting gases from the outlet to a condenser means that includes a condenser chamber, and returning the condensate from the condenser means to the coolant jacket.

The coolants used in the process are organic liquids, some of which are miscible with water and others of which are substantially immiscible with water. In the case of substances that are miscible with water, the process can tolerate a coolant containing a small amount of water, perhaps as much as ten percent or more, but the operating parameters of the process are enhanced by keeping the water content to a minimum. Suitable substances that are miscible with water include ethylene glycol, propylene glycol, tetrahydrofurfuryl alcohol, dipropylene glycol and mixtures thereof. In the case of substances that are substantially immiscible with water, water is also an impurity, but water will not go into solution with the coolant substance except in trace quantities, usually less than one percent. Water should not be present in amounts in excess of about one percent (1%) by weight over and above the trace amount in solution. Suitable substances that are substantially immiscible with water include 2,2,4-trimethyl-1,3-pentanediol monoisobutyrate, dibutyl isopropanolamine, and 2-butyl octanol.

For reasons that are discussed below, it is preferable to circulate liquid coolant from the bore portion of the coolant jacket and return it to the head portion. The process may further comprise the step of conducting all gases residing in the highest region of the condenser through a vent pipe to a recovery condenser that is at a location where it is likely to stay cooler than the main condenser, such that condensable substances in the gases conducted to the recovery condenser are condensed and may be returned to the main condenser. For example, the condensate from the recovery condenser can be continuously returned to the condenser by gravity or intermittently returned by gravity or siphoning that is induced whenever the pressure within the recovery condenser exceeds the pressure in the main condenser plus the head pressure of the quantity of condensate being returned when it occupies the vent pipe, which occurs during periods of reduced thermal loading and upon cool-down. Gases in the recovery condenser may be vented to the atmosphere through either an open vent or a low pressure relief valve. Alternatively, a two-way low pressure relief valve can be provided between the main condenser and the recovery condenser, in which case the process includes the steps of blocking the transfer of gases from the main condenser to the recovery condenser except when the pressure in the main condenser exceeds the pressure within the recovery condenser by a predetermined amount and blocking the passage of gases from the recovery condenser to the main condenser, except when the pressure in the recovery condenser exceeds the pressure in the main condenser by a predetermined amount.

In accordance with a further variation in the process of the invention, all gases residing in the highest region of the condenser may be vented through a vent to the atmosphere, which vent is located remotely from the inlet by which gases enter the condenser from the engine coolant jacket, the vent, however, being blocked by a pressure relief valve so that the gases are not vented unless the pressure within the condenser exceeds the ambient pressure by a predetermined amount.

There is further provided, in accordance with the present invention, apparatus for cooling an internal combustion engine comprising a coolant jacket around at least part of each combustion chamber and exhaust runner of the engine and containing a boilable liquid coolant having a saturation temperature above 132° C. at atmospheric pressure, a liquid cooling circuit including a heat exchanger and mechanical pump means for circulating the coolant from the coolant jacket through the heat exchanger and back to the coolant jacket to provide heat rejection in the heat exchanger such that no vapor is formed in the liquid cooling circuit as a result of the pressure drop induced by the pump and such that the temperature of the coolant within portions of the head portion of the coolant jacket that are in elevation above locations adjacent to combustion chamber domes and exhaust runners are maintained below the saturation temperature of the coolant for the system pressure, at least one outlet from the highest region in the coolant jacket adapted to remove and release continuously by substantially unrestricted convection from the coolant jacket substantially all gases, including vapor formed by localized boiling of the liquid coolant in areas adjacent to combustion chamber domes and exhaust runners, other than gases that condense in the coolant within the jacket, whereby the major part of the coolant jacket in areas around combustion chamber domes and exhaust runners is kept filled with coolant in the liquid phase at all times, condenser means including a condenser chamber for receiving the gases removed and released from the coolant jacket through the outlet and condensing condensable constituents thereof, and return means for returning the condensate from the condenser means to the coolant jacket.

The apparatus of the invention may have additional characteristics or variations, as follows:

1. The coolants used in the invention are those that have been described above in connection with the cooling process.
2. The coolant is circulated from the bore portion of the coolant jacket and returned to the head portion.
3. The condenser is located at an elevation higher than that of the outlet from the coolant jacket in order that condensate may be returned from the condenser to the coolant jacket by gravity.
4. There are several ways of handling the gases removed from the coolant jacket through the outlet into the condenser that are not condensed in the condenser. The entire coolant system may be closed except for a pressure relief valve that is designed to operate only under extreme load, ambient temperature or altitude changes or under emergency conditions but does not ordinarily open. In another arrangement the apparatus includes a recovery condenser that is connected to the main condenser and is located remotely from the main condenser such that it can be maintained at a substantially lower temperature than that of the main condenser. The recovery condenser is designed to condense condensable substances in the gases vented from the main condenser while venting through an open vent any gases that are not condensed. The condensate collected in the recovery condenser can be returned by gravity, pumped back or intermittently returned by gravity or siphoning action whenever the pressure in the recovery condenser exceeds the pressure in the main condenser plus the head pressure of the condensate in the recovery condenser. The vent from the recovery condenser may also include a pressure relief valve or a pressure relief valve can be interposed between the main condenser and the recovery condenser.

The process and apparatus of the present invention may be considered hybrids of circulating liquid and vapor cooling processes and apparatus, as there are elements in common. The liquid cooling circuit provides for transfer of heat from the coolant so that it returns to the engine coolant jacket at a temperature below the saturation temperature of the coolant. Most of the heat rejected from the engine is transferred to the ambient air by the heat exchanger in the liquid circuit. In the above respects the process and apparatus resemble conventional liquid cooling processes and systems.

Vapor produced in the coolant in the engine coolant jacket by transfer of heat from the hotter regions of the the combustion chamber domes and around the exhaust runners that is not condensed in the liquid rises by convection to the highest region of the head coolant jacket and is conducted away through the outlet to the condenser. Condensable substances in the vapor are condensed in the condenser and are returned to the coolant jacket. In these respects, the invention resembles a vapor cooling system.

The present invention differs from a conventional circulating liquid cooling system in a very important way, namely, in that vapor and other gases are removed from the highest region of the coolant jacket rather being trapped within the liquid coolant and circulated with the liquid phase coolant. In a conventional circulating liquid system the vapor generated at hot regions of the combustion chamber domes and around the exhaust runners can be trapped in places where the circulation rate of the liquid coolant is relatively low and where there is little opportunity for the vapor to escape by convection because of the existence of a zone of relatively high velocity circulation of liquid coolant nearby. Such regions are sites for the formation of vapor pockets, which act as barriers to effective heat transfer between the metal and the coolant. There are the places where hot spots can develop and cause engine knocking. Under heavy loads the amount of vapor produced in the coolant jacket increases to an extent that substantial quantities of vapor are trapped in the coolant and cause displacement of liquid coolant and some vapor into the overflow tank of the system. Under such conditions the amount of vapor in the cooling system will build up to the point that the ability of the cooling system to remove the heat produced in the engine is actually diminished at a time when it is most needed. In order for vapor to become condensed in a state-of-the-art circulating liquid cooling system, the vapor must be transported from the coolant jacket to the radiator entrained within liquid coolant along a path that is normally substantially horizontal. The velocity of the vapor is dependent upon the movement of the liquid within which the vapor is entrained. The liquid velocity is a function of the pump speed and hence the engine speed. Under conditions when the rate of vapor production is a significant percentage of the rate of liquid movement, large amounts of vapor occupy the coolant jacket.

The present invention provides for the unrestricted release of vapor from the highest region in the coolant jacket, thus minimizing the extent to which vapor can be trapped in the liquid coolant both in the coolant jacket and in the circulating system. The rate of liquid circulation required with the present invention is less than the rate required in a conventional circulating liquid system and is not a function of the need to transport vapor. The system of the present invention is conductive to rapid release of vapor from all surfaces within the coolant jacket and unrestricted rapid flow by convection to the outlet in the highest region of the coolant jacket independent of the movement of liquid coolant. Gases are free to leave the coolant jacket, even when there is no circulation of liquid coolant.

The water content of the coolant is preferred to be minimized in the case of substances that are miscible with water and kept below one percent (1%) in the case of substances that are immiscible. The assumption that a coolant can contain no water at all is not realistic, particularly for substances that are miscible with water, all of which are hygroscopic. Water in a substance miscible with water causes the resulting solution to exhibit a boiling range. Although the initial boiling point of the range is lower than that of the pure substance, the temperature at local areas where boiling occurs is limited by the saturation temperature of the pure substance rather than by the initial boiling point. The point here is that the addition of a small amount of water to a pure substance miscible with water, although lowering the initial boiling point, does not appreciably lower the temperature in areas of high heat flux due to localized distillation and local purification of the liquid.

A negative feature of a wide boiling range induced by the inclusion of water is that cavitation of the pump is more likely to occur. A liquid that is near its saturation temperature can easily become vaporized by a slight drop in pressure. Cavitation of the mechanical pump and vaporization of coolant within the lines feeding the input side of the pump will occur when the pump draws upon liquid that is near its saturation temperature. Under these conditions, circulation of coolant liquid through the heat exchanger ceases and the cooling system must rely entirely upon the condenser means for all of the cooling system heat rejection. As the addition of water causes the temperature of the bubble point of the coolant to drop, the temperature at which the liquid coolant must be maintained in order to prevent pump cavitation must also drop. In practice, it appears that pump cavitation is prevented when the bulk liquid temperature within the coolant jacket is on the order of 10° C. lower than the initial boiling point of the coolant. A desire for a reasonable margin of safety would indicate that the system be designed so that the bulk liquid temperature is maintained on the order of 20° C. lower than the initial boiling point of the coolant. A non-pressurized system, for example, using a ninety-nine percent (99%) solution of propylene glycol that maintains the bulk coolant temperature at or below 157° C. (315° F.) will avoid pump cavitation while a system utilizing a ninety-five percent (95%) solution of propylene glycol would have to maintain the bulk coolant temperature at or below 129° C. (264° F.) in a non-pressurized system. Operation of the system in aircraft at high altitude while maintaining a low system pressure would indicate keeping the bulk liquid temperature on the order of 30° C. lower than the initial atmospheric boiling point of the coolant.

It is important to recognize that with the coolant substances used in the present invention that are miscible with water there will be some vapor that does not condense in the coolant jacket and that will be removed through the outlet to the condenser whenever the temperature of the coolant throughout the head coolant jacket is above the boiling point of water at the prevailing pressure. The lower the temperature of the liquid coolant in the upper portion of the coolant jacket, the greater will be the amount of vapor that is condensed in the coolant jacket. Nevertheless there will usually be some vapor that will not condense, because the temperatures within the coolant jacket are not low enough to complete the condensation. This residual vapor is often trapped in conventional water-glycol pumped liquid cooling systems. An important characteristic of the present invention is the continuous removal of the residual vapor to the condenser, which insures that the major portion of the upper region of the coolant jacket contains coolant in liquid state. Removal of the vapor greatly enhances heat transfer between the metal and the coolant. No longer is the effectiveness of the coolant to remove heat from the metal reduced by the trapped pockets of vapor. No longer is it necessary to rely on high pumping rates to sweep vapor from the hot surfaces and conduct it to cooler regions and to the radiator.

The behavior of coolants containing a substance that is immiscible with water and water differs from coolants containing a miscible substance and water. The immiscible coolant mixture initially boils at a temperature slightly below the boiling point of water, and if the vapor pressure of the immiscible coolant is very much less that that of water, the vapor is almost entirely water. Accordingly, the water boils off and is conducted to the condenser. After the water boils off, the boiling point of the coolant is that of the substance. The vapor of the substance that is formed in the hot regions of the engine head jacket will almost certainly condense completely in the cooler liquid in the coolant jacket. Meanwhile, as long as the temperature of the coolant in the head remains above the boiling point of water, any water condensate returning to the engine from the condenser boils off very quickly upon reentering the coolant jacket. It is desirable initially to fill the system with a coolant containing as little water as reasonably possible. After filling, the system may be purged of most water by venting the condenser through a low pressure relief valve (say, 2 psi). Thereafter, apart from water that enters the system, the coolant will stabilize in composition with a small amount of residual water that will exist in the system during normal warmed up running of the enigne mainly in the vapor state.

The immiscilbe coolant substances will rarely produce vapor that leaves the head jacket, inasmuch as the condensation temperature of the vapor is the same as the boiling point of the liquid. Liquid coolant is continuously circulated in the liquid cooling circuit, and heat is rejected in the heat exchanger (radiator) to keep the bulk temperature of the coolant in the engine coolant jacket below the boiling point. Therefore, coolant vapor formed at hot surfaces is usually condensed in the cooler liquid coolant.

Under unusual operating conditions (hot weather and high loads), vapor of the immiscible substance of the coolant may not condense completely in the coolant jacket and will leave the jacket through the outlet and enter the condenser, where it will condense and return as condensate to the engine coolant jacket. This can occur when climbing a long grade or when the vehicle stops at idle after running under a high load. In the latter case an engine-driven pump provides a reduced rate of circulation at idle, and the temperature of the liquid coolant can rise high enough for a brief time so that it does not condense the coolant vapor completely.

Similarly, when the engine is stopped, it enters a cool-down mode in which no liquid is circulated. The hot metal stores a substantial amount of heat, which is transferred to the coolant. For a while, perhaps as much as five minutes, coolant vapor is generated, rises into the condenser, condenses and returns to the engine as condensate. During cool down, the free release of vapor from the highest region of the coolant jacket ensures effective cooling of the engine by maintaining the major portions of the regions of the coolant jacket near the hot metal surfaces filled with liquid coolant, thereby preventing large thermal stresses that can lead to head cracking and heat gasket failure. The system prevents the cyclical buildups and releases of vapor pockets that allow abrupt and substantial changes in metal temperatures in the combustion chamber domes and exhaust runners.

An important function of the condenser of systems embodying the present invention is to accommodate the changes in apparent coolant volume between cool and hot conditions. These changes are of the order of ten percent (10%) to fifteen percent (15%). In conventional forced liquid cooling systems, the expansion is accommodated partly by overflow of coolant into the expansion tank and partly by compression of the trapped gases. In the present invention, the expansion is taken care of by (1) a rise of the liquid coolant level into the vapor outlet conduit and, depending on the design, into the lower part of the condenser and (2) by release of vapor from the liquid coolant into the condenser where the vapor pressure is kept low by expansion, cooling and condensation.

All of the coolant substances mentioned above can be used in diesel engines, the high boiling temperature substances being preferred, because diesel engines operate most efficiently at high bore temperatures. Attention must, of course, be given to the design of the lubrication system at the high temperatures, such as effective filtering, use of high temperature synthetic lubricants and, possibly, oil cooling. Heavey duty diesel engines for trucks, buses, and locomotives normally require sophisticated lubrication systems anyway.

Development and testing of the present invention to date indicates strongly that there are upper limits on the boiling points of the coolant substances that can be used in spark-ignition gasoline engines. So far, ethylene glycol, propylene glycol and tetrahydrofurfuryl alcohol have been identified as suitable for gasoline engines. Dipropylene glycol and the three immiscible coolant substances referred to above have boiling points that are too high for use in spark-ignition gasoline engines, at least according to present knowledge.

Water is considered to be an undesirable constituent of coolants used in the present invention. The larger the water content, the greater the amount of vapor that moves from the cooling jacket to the condenser, and the greater will be the capacity of the condenser required to handle the vapor. Water is a source of corrosion, erosion and deposits in engine cooling systems, especially in aluminum engines.

All of the coolants identified specifically above have freezing points adequate for cold climates, except for ethylene glycol, which has a freezing point of −12.7° C. (9° F.). It is well known that the addition of a small percentage of water to ethylene glycol will lower the freezing point, but that is not desirable in the present invention. It is also well known that the addition of other glycols, such as propylene glycol, to ethylene glycol, provides a liquid having a freezing point much lower that ethylene glycol (see Clendenning, K. A., "Antifreeze Properties of Tetrahydrofurfuryl Alcohol and Anhydrous Glycol Solutions," *Canadian Journal of Research,* Vol. 26, Sec. F, No. 5, pp. 209–20, May, 1948), and a mixture of ethylene glycol and propylene glycol is a suitable coolant for cold climates.

The principal function of the vapor outlet and condenser sub-system of the present invention is to allow vapor to leave the highest region of the head portion of the engine coolant jacket as freely as reasonably possible so that the content of vapor in the engine coolant jacket and liquid cooling circuit are minimized. The condenser also accommodates expansion of the coolant, as described above. It is important that as much of the coolant vapor as possible that exists in the condensing sub-system can be condensed so that coolant losses from the system are kept to a minimum. The condenser, of course, provides heat rejection, but to only a minor extent, generally only above five percent (5%) of the total heat rejected by the cooling system.

A significant advantage of the present invention is the ability to operate an internal combustion engine at a generally higher temperature level in the engine bores than has been possible in the past. The ability to operate the bores at a higher temperature level provides improvements in fuel economy due, first, to a lower rate of heat rejection from the engine, which means a higher utilization of heat in the thermal cycle, second, to more complete combustion of the fuel by a reduction in quenching, third, by more even temperature distribution from top to bottom of the engine for reduced friction and reduced wear and, fourth, by better lubrication through a uniform high temperature along the swept surfaces.

Another advantage of the invention is a reduction in all three major emissions in gasoline engines and additionally, particulates in diesel engines due to more complete combustion and reduced detonation.

Both the heat exchanger and the condenser may be relatively small because less heat is rejected by the engine through the cooling system and because the temperature differential between the high boiling temperature coolants used in the invention and the ambient air is much greater than that between water or water/-glycol and air.

The high saturation temperature, organic substances used as coolants in the invention do not produce corrosion or deposits in the coolant jacket, condenser, radiator or any other part of the cooling system. Accordingly, the heat exchanger and condenser can be made of aluminum at relatively low cost. Moreover, the corrosion and errosion problems encountered in aluminum engines with state-of-the-art circulating liquid cooling systems are eliminated.

The cooling process and apparatus, according to the invention, operate under either ambient pressure or a small pressure above ambient, generally from 7 to 35 kPa (1 to 5 psi) gage. Therefore, all components of the cooling system can be of simpler design than in present high pressure systems and are less prone to leakage and failure.

The small size of the heat exchanger and condenser and the reduced amount of air flow required to remove heat from them enables them to be physically located in places other than the usual nose position of the radiators of conventional pumped liquid cooling system making it possible to largely close up the nose of the vehicle and provide an aerodynamically shaped nose portion. The heat exchanger can be oriented to fit any design configuration, even horizontally. The condenser and the radiator can be combined into a single unit in which case the condenser portion would be above the radiator and in elevation above the level of the liquid coolant. As this unit would be smaller than a conventional radiator and would require less air flow through it, the unit could be located back from the nose of the vehicle and offer the same aerodynamic possibilities as the configuration of the radiator and condenser as separate units.

The circulation rates of liquid coolant in the liquid cooling circuit are less than those required in conventional cooling systems, which means that a simple low-cost pump requiring less power can be used.

A cooling system embodying the present invention requires a radiator one-third to one-sixth the size of a radiator required for a state-of-the-art circulating liquid cooling system. The volume of coolant required is reduced by an amount equal to the difference between the respective radiator volumes. When considered in conjunction with the fact that aluminum may be employed in radiator and condenser construction and that the piping need withstand only low pressures, the invention can be seen to provide important savings in weight and cost.

Another desirable attribute of the present invention is the ability to flow the coolant in the reverse direction of what is in current systems the only practical way to pump coolant. In particular, it is not effective in cooling systems according to the current state-of-the-art to pump coolant out of the bores, through the radiator and back into the cylinder head. The reason for this is that current systems by necessity operate the bulk coolant temperature very close to the saturation temperature of the coolant at the system pressure. When coolant is circulated from the head jacket through the bore areas to an outlet, the hottest coolant in the engine passes the bore areas. In the case of a system utilizing a water-antifreeze coolant, the coolant will emerge from the bore areas and enter the pump at a temperature very close to its boiling point. The pressure drop due to suction of the pump will cause the pump to cavitate, and the flow will be sharply curtailed or will stop altogether. This problem is avoided in this invention by maintaining liquid coolant temperatures far enough below the boiling point of the coolant to prevent the coolant from vaporizing in the pump or in the conduits upstream from the pump. The higher the saturation temperature of the coolant the easier it is to hold the liquid coolant temperature at a level well below the saturation temperature.

These are important advantages derived from the ability to circulate liquid coolant from the block portion of the coolant jacket to and through the radiator and return it to the head portion of the coolant jacket. The cooled liquid from the radiator that enters the head portion is in the best condition for condensing vapor within the head, where the major part of the heat rejection from the engine occurs, because the coolant is not preheated in the block portion as it will be if it is circulated from the head and returned to the block. Moreover, the hotter coolant from the head pulls head down into the block, so the bores run hotter, in constrast with the reverse situation when the cooled liquid from the radiator is returned to the block.

For a better understanding of the invention, reference may be made to the following description of exemplary embodiments, taken in conjunction with the figures of the accompanying drawings.

DESCRIPTION OF EMBODIMENTS

Figure 1:
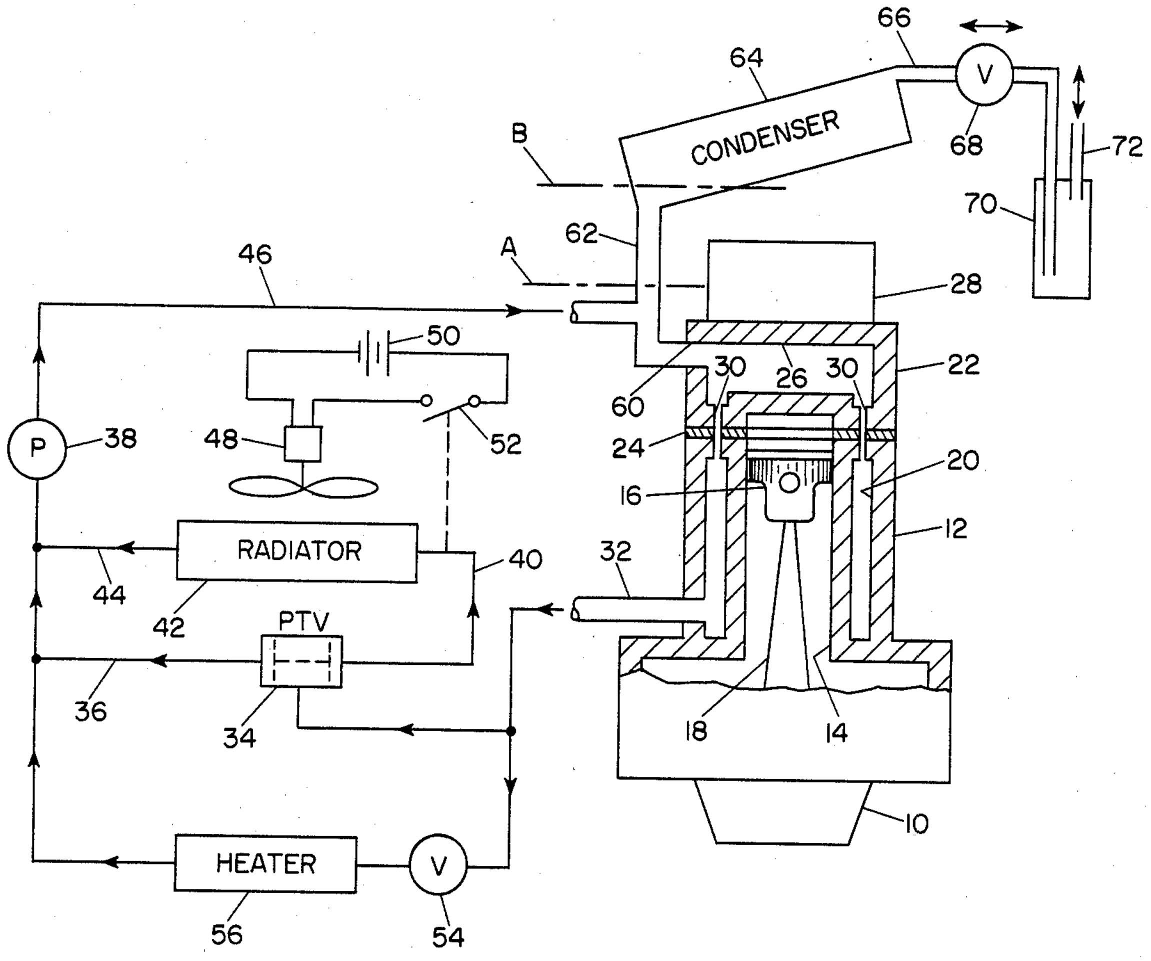
FIG. 1 is a schematic cross-sectional view of an engine equipped with a cooling system embodying the present invention.

FIG. 1 depicts a piston-type internal combustion engine having an oil pan 10 bolted to the bottom of a block 12 formed with cylinder bores 14 in which pistons 16 reciprocate under the control of connecting rods 18 carried by a crankshaft (not shown). A block coolant jacket 20 surrounds the sleeves that define the cylinders 14. A head 22 is bolted to the block, a head gasket 24 being interposed between the block and head to seal off the combustion chambers from the coolant passages within the jacket and the coolant passages from the exterior of the engine. A head coolant jacket 26 is formed within the head. A valve cover 28 is mounted on top of the head. For simplification, the valves and valve-associated components and the intake and exhaust runners are not shown. The block and head coolant jackets communicate through numerous holes 30 in the head gasket.

A conduit 32 leads from a port opening through the lower portion of the block into the block coolant jacket 20 to a proportional thermostatic valve 34. When the temperature of the coolant removed from the block coolant jacket 20 is relatively low, the valve 34 conducts all of the coolant to a bypass line 36 that leads to the intake side of a pump 38, which may be either an engine-driven pump or an electric pump. The pump may, alternatively, be located in the conduit 32. When the coolant circulated from the block coolant jacket is at a high temperature, the valve 34 directs all of the coolant through a conduit 40 to a heat exchanger (radiator) 42. Between the low and high temperature thresholds of the valve, the valve proportions the flow between the bypass line 36 and the radiator 42. The coolant leaves the radiator 42 through a conduit 44 and is returned by the pump 38 to the head coolant jacket 26 through a conduit 46. When the coolant drawn from the lower portion of the block coolant jacket 20 is at a predetermined high temperature, a fan 48 powered by the vehicle battery 50 is switched on by a thermostatic switch 52, thereby to increase the exchange of heat from the radiator to the ambient air.

The liquid cooling circuit also includes a branch for supplying heat on demand to the passenger compartment that includes a control valve 54 and a heat exchanger 56.

The radiator 42 can be of any suitable construction, such as several parallel finned tubes. The tubes can be of relatively large diameter, and the radiator can be made of aluminum, inasmuch as the coolants used according to the invention do not corrode or erode aluminum. The radiator 42 is not a repository for gases, and no part of it is required to be positioned above the highest level of the head coolant jacket. The location of the radiator 42 is a matter of design choice; it is small in size, so it can, for example, fit easily behind the front bumper of a vehicle. It can be installed horizontally. Air can be ducted through it, and the nose of a vehicle can be aerodynamically shaped and closed up for reduced drag. The radiator 42 might also double as the heat exchanger for the passenger compartment heater with ducting and duct control valves arranged to conduct hot air from the heat exchanger to the passenger compartment and/or to the outside, as selected by the vehicle occupant through a heater control.

Inasmuch as a cooling apparatus, according to the invention, does not rely on a high rate of coolant circulation to sweep coolant vapor out of the head jacket, there are several ways of controlling the heat rejection in the liquid circuit to maintain desired temperature levels in the engine under varying loads and ambient conditions. For example, the valve 34 can be replaced by a tee and a thermostatic throttling valve placed in either the conduit 40 or the bypass conduit 36 to regulate the flow rate through the radiator 22. Another approach is to control the heat exchange rate of the radiator by thermostatically controlled dampers in ducting for the radiator or by having the radiator subject to a relatively low circulation of air induced by vehicle motion but boosted when required by a thermostatically controlled fan. Still another possibility is the use of a thermostatically controlled variable speed pump. Those skilled in the art can readily devise suitable liquid cooling circuits for use in the invention. The fact that the radiator is of small size and provides a high heat exchange rate (because of the high temperature coolant circulated with little vapor present and because of the lower requirement of heat rejection) eliminates many of the design restrictions imposed by the demands of conventional cooling systems.

In the hotter regions of the engine head, such as over the combustion chamber domes and around the exhaust runners, some coolant will vaporize under all operating conditions of the engine, except during warm-up. Inasmuch as the liquid coolant is maintained at a temperature below the saturation temperature of the coolant in locations above combustion chamber domes and exhaust runners, most of the vapor formed at these hot surfaces will condense in the liquid coolant in the head coolant jacket. The amount of vapor that is not condensed in the head jacket will, of course, depend upon how much vapor is produced, the overall or bulk temperature of the liquid coolant present in the head coolant jacket and the condensation characteristics of the vapor in the head jacket. If the coolant is miscible with water and a small amount of water is in solution with the coolant, most of the coolant vapor will condense within coolant liquid that is lower in temperature than the saturation temperature of the coolant and higher in temperature than the saturation temperature of water, but not all of it. Coolants miscible with water are hygroscopic and should be assumed to contain some water.

Coolants immiscible with water are not hygroscopic, will not absorb water when in contact with ambient air containing water vapor, and can more easily be maintained very "dry" compared to miscible coolants. With coolants immiscible with water, the vapor of the coolant will normally become fully condensed within the head jacket. Any water present with an immiscible coolant will vaporize early at a temperature slightly lower than the saturation temperature of water. The resulting water vapor, together with a small quantity of coolant vapor in a molar ratio equal to the ratio of the respective vapor pressures, will not condense in the head jacket and will enter the condenser as a vapor, partially or fully condense, return as condensate to the head jacket, and vaporize again. Allowing some of this vapor to leave the system will reduce the water content of the coolant while venting only small amounts of the coolant substance. The molar ratio for water with 2,2,4-trimethyl-1,3-pentanediol monoisobutyrate is, for example, approximately 450 to 1.

Whatever vapor is not condensed in the liquid coolant in the head jacket rises by convection to the highest region or regions of the head coolant jacket, from which it is removed through one or more outlets 60 leading from the highest region or regions of the head coolant jacket. The head coolant jacket may be designed to facilitate movement of the vapor to one or more high regions to ensure, to the extent reasonably possible, that vapor can readily be removed from the head coolant jacket through the outlets 60.

The vapor removed from the head through the outlet or outlets is conducted through a conduit 62 to a vapor condenser 64. In the embodiment shown in FIG. 1, the condenser is located above the head coolant jacket in all orientations of the engine in normal use so that the condensate from the condenser can be returned to the engine by gravity through either a return conduit (not shown) or the same conduit 62 by which the vapor is conducted into the condenser. The conduit by which condensate is returned to the engine coolant jacket may also be used to conduct the coolant from the liquid coolant circuit back to the engine, as shown in FIG. 1. Alternatively, the return conduit or conduits for pumping liquid coolant from the liquid coolant circuit back to the engine can be separate from the return conduit or conduits for returning condensate to the engine coolant jackets.

The design of the condenser 64 can vary considerably. Good results have been obtained with metal vessels that allow relatively unrestricted movement of the vapor throughout to facilitate contact of the vapor with the walls. Consistent with the desirability of minimizing any substantial restriction on the movement of vapor, lest vapor back up into the head coolant jacket and be somewhat impeded from leaving the coolant jacket, the conduit 62 should be of a large diameter, say 1.5 in. in the case of automobile engines. The condenser should also be designed so that condensate flows by gravity to a collection point, from which it can then be conducted back to the engine coolant jacket. In a vehicle, a desirable arrangement is an elongated condenser vessel mounted under the hood lengthwise of the engine compartment, sloping up from front to back. The condenser can be constructed as a body panel of the vehicle, such as part of the hood.

Regardless of the amount of vapor condensation that occurs within the coolant jacket any air volume that exists over hot coolant will acquire coolant vapor until the volume becomes saturated. The amount of vapor driven off by this means is a function of the vapor pressure of the coolant, and the higher the temperature, the higher the vapor pressure. The relatively cool walls of the condenser 64 serve not only to condense vapor that was formed by boiling but also to condense vapor that has evaporated from the hot liquid coolant surfaces.

The vapor of the high molecular weight organic compounds used as coolants in accordance with the invention are heavier than air; therefore, they initially settle in air and tend to collect in lower portions of the condenser prior to diffusion into the air. To assist this stratification the inlet to the condenser from the conduit 62 can be at the lowest region. Baffles can be provided in the condenser to control the movement of vapor within it in a manner that enhances contact of the vapor with the condenser walls and minimize movement of the incoming vapor directly to locations high in the condenser. As condensation progresses the percentage of water vapor in the remaining vapor increases. Vapor that is mostly water vapor weighs less than air and moves by convection to the upper portions of the condenser.

The apparent volume of the liquid in the system varies with temperature and the amount of boiling activity; the liquid expands and uncondensed vapor displaces the liquid to fill a greater volume causing the liquid level to increase. As shown in FIG. 1, the system is initially filled with liquid coolant to a level A so that the coolant jacket is filled at all times. When the system heats up the expansion of the coolant is on the order of 15%, and the coolant level will rise into the level B conduit 62 and perhaps into the condenser, as indicated by FIG. 1.

If the condenser is not vented the increase in apparent liquid volume will cause a system pressure increase. In addition, heating of the air within the condenser and an increase in the presence of uncondensed coolant or water vapor will further increase the pressure. The extent of the pressure increase as measured against ambient pressure based upon these factors is a function of the volume of the condenser and the average temperature of the gases within the condenser. At constant altitude the extent of the pressure build up would be on the order of 70 kPa for a typical system. Altitude changes also affect the pressure difference between the enclosed system and ambient. From sea level to 3,000 meters the ambient pressure drops 31 kPa and to 6,000 meters the pressure drop is an additional 26 kpa.

The design of the system has to take into account the rises and falls in pressure. There are several possibilities, one of which is shown in FIG. 1. A vent pipe 66 leads from a region high in the condenser and remote from the vapor inlet where the gases present are mainly air and water vapor—most of the vapor of the coolant substance will stay in the bottom and condense on the walls of the vessel, as discussed above. A two-way pressure relief valve 68 in the vent pipe blocks the passage of gases from the condenser 64 through the vent pipe until the pressure increases to a predetermined level, say 2 psi. When the valve 68 opens, gases from the top of the condenser flow into a recovery condenser 70, a small vessel located in a place likely to be cool at all times. As the most likely location for the condenser 64 is in very close proximity to the engine, and whereas the condenser 64 may normally contain some hot coolant liquid, the condensing surfaces of the recovery condenser 70 will normally be considerably lower in temperature than the condensing surfaces of the condenser 64, enabling the recovery condenser 70 to condense vapor left uncondensed by the condenser 64. The pipe 66 opens close to the bottom of the recovery condenser where the opening will become covered by condensate in the vessel. An open vent 72 leads from the top of the vessel to the ambient air in a manner that will be protected from air flows that would substantially alter the ambient static atmospheric pressure at the vent. Condensable substances conducted by the vent pipe into the recovery condenser are condensed and collected.

The valve 68 will allow gases to flow to the recovery condenser only during periods when large amounts of vapor are produced in the engine coolant jacket and the condenser 64 is operating near its full capacity, such that the gases in the condenser vessel are hot enough to increase the pressure enough to open the valve 68. As soon as the gases in the condenser cool, the pressure drops, and because gases (mostly air and water vapor) have left the condenser and have been vented through the vent, the pressure in the condenser (and the cooling system) will fall below atmospheric. The valve 68 will open at a threshold pressure difference when the valve pressure plus the head of condensate in the recovery tank that is displaced into the vent pipe are less than the difference in pressure between the atmosphere and the pressure in the cooling system. This design for handling the pressure changes in the cooling system provides for recovery of all or nearly all condensables and is desirable when it is expected that the capacity of the condenser to handle the vapor from the engine will be approached from time to time and it is desired to limit the pressure in the system and not increase the capacity of the condenser. The recovery condenser can be small and designed with baffles or filled with metal wire or fibers to provide a large surface area for high condensing efficiency. The vent can have an air filter to keep out dust.

A primary reason for having the valve 68 is to reduce the "breathing" of air into and out of the system. The amount of coolant vapor that may leave the system with an exchange of air depends upon the ability of the condenser 64 and the recovery condenser 70 to condense the vapor. In some cases the valve 68 may be omitted entirely without unacceptable coolant loss.

Venting from the recovery condenser 70, with or without the valve 68, is beneficial when water vapor leaves the system. A reduction in water within the system will allow the utilization of a smaller condenser 64. If the coolant is miscible with water a reduction in water content will cause the saturation temperature of the coolant to rise, narrowing the difference between the saturation temperature of the coolant and that of the coolant substance and lessening the possibility of cavitation in the pump 38. If the coolant is immiscible with water a reduction in water will reduce the amount of water vapor and condensate cycling between the head jacket 26 and the condenser 64.

By choosing a relatively high setting for the valve 68, generally on the order of 70 kPa (10 psi), the cooling system is effectively closed except under unusually heavy load conditions or large changes in altitude. Also, the vent will open due to the use of coolants that are too volatile or due to component failures that may cause pressurization of the cooling system such as a head gasket leak. In order to operate the system under higher pressures the system components as assembled must be capable of sustaining the pressure. A consequence of operating under higher pressure is that the saturation temperature will increase to a higher level. A 70 kPa rise in pressure will raise the saturation temperature of the coolant about 20° C.

Figure 2:
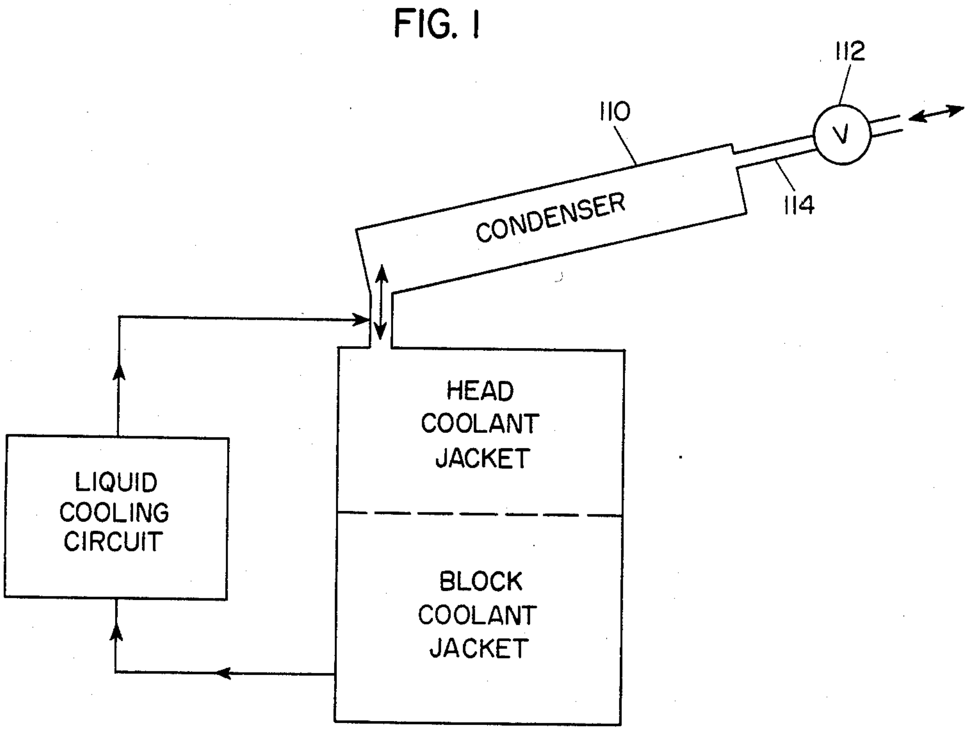
FIG. 2 is a schematic diagram of another embodiment of the invention.

The apparatus shown in FIG. 2 is like that shown in FIG. 1 except there is no recovery condenser. Instead, the condenser 110 is designed with excess condensing capacity so that the function of the recovery condenser is incorporated into it. A low pressure two-way check valve 112, say 35 kPa (5 psi) both ways is located in a vent pipe 114 and is intended to open during warm-up and shut-down to allow air to be expelled from and drawn into the system. During warm-up air is pushed out through the vent as the apparent liquid volume increases and the air in the condenser heats up. Once the system warms up to a normal load condition under the prevailing ambient conditions, the vent closes and is not expected to open except under heavy load changes or after large changes in altitude. In the instances that it opens, other than during warm-up, most of the gas expelled will be air. The small vapor loss involved will be trivial, even over long periods, and probably no more than is experienced with the overflow tanks in current use. The design of FIG. 2 allows the recovery condenser to be omitted, but the condenser 110 has to be larger than the condenser 64 required for the embodiment of FIG. 1. The condensers of both FIGS. 1 and 2 can be reduced in size by reducing the water content of the coolant. Apparatus designed for use with coolants immiscible with water can have smaller condensers, in as much as the coolant is not hygroscopic.

A variation of the system in FIG. 2 is one in which the valve 112 is controlled thermostatically to hold an increased pressure, subject to emergency relief, once the engine and cooling system have warmed up. In this form, it combines an essentially open vent for warm-up and shut-down with a closed system under running conditions. The maximum pressure can be kept lower than a fully closed system, because the temperature and pressure increases of the warm-up can be subtracted from the total temperature-pressure change to peak load.

Apart from the different modes of dealing with temperature-pressure changes in the system the above-described embodiments operate exactly the same way. Liquid coolant is continuously pumped from the block portion of the coolant jacket through a condenser (or a bypass during warm-up and low load conditions in cold weather) and returned to the head portion of the engine coolant jacket at a temperature below the saturation temperature of the coolant so that some portion of the vapor produced along the hot metal surfaces of the dome of the combustion chamber and around the exhaust ports condenses in the liquid coolant. The vapor that is not condensed in the liquid coolant is removed from the highest region and conducted to the condenser where it condenses. The condensate is returned to the coolant jacket.

The system should be designed so that the liquid coolant returned to the jacket from the liquid cooling circuit is at a temperature sufficiently high to obtain the benefits of running the engine at a comparatively high bulk temperature, as described in detail above, but low enough to be able to condense vapor in the head coolant jacket and maintain the temperature of the coolant low enough in the part of the liquid circuit upstream from the pump to prevent pump cavitation.

The drawings depict vertically oriented piston engines. The cooling system of the present invention can, of course, be used in engines that are mounted with the axes of their cylinders oriented oblique to the vertical or horizontally. In either case, the vapor will seek the highest region or regions of the cooling jacket, and the vapor outlet or outlets should be correspondingly located. The system can also be used for Wankel engines. All discussion above referring to the head coolant jacket pertain to the jacketed area around combustion and exhaust portions of the Wankel engine, while discussions of the block coolant jacket apply to the jacketed areas around the swept volume portions of the Wankel combustion chamber. Finally, the present invention can be used in an engine in which only the head is cooled or in which less than all of the zones surrounding the swept areas of the cylinder walls are cooled by liquid coolant.

The drawing depicts apparatus in which the condenser is mounted above the engine for gravity return of condensate, which is preferred. Nonetheless, the condenser can, if necessary, be located below the highest liquid coolant level and the condensate mechanically pumped back to the engine. The design of such a system should include attention to providing a volume in the vapor outlet conduit(s) above the head to accommodate a rise in the liquid level and to minimizing restriction of the flow of vapor in the conduit to the condenser. A slow speed, low flow rate pump for condensate is sufficient.

In the embodiment of FIG. 1 the recovery condenser 70 is mounted lower than the condenser 64 and is arranged for siphon return of condensate to the condenser 64. Alternatively, the recovery condenser can be mounted higher than the condenser 64 making possible a gravity return of condensate.

The vaporization and condensation cycle continues to function after shut-down of the engine in the process and apparatus of the present invention. Some metal within the cylinder head in contact with liquid coolant will be at a temperature higher than the saturation temperature of the coolant and boiling will continue until the metal temperature reaches the saturation temperature of the coolant. If the liquid circulation pump is engine driven or is otherwise stopped upon shut-down of the engine, the temperature of the coolant within the head jacket will rise to the saturation temperature. Less of the vapor will be condensed in the liquid coolant, and an increased amount of vapor will enter the condenser. Although the amount of heat energy stored in the engine at temperatures above the saturation temperature of the coolant is not large compared to the heat imparted to the coolant during engine operation, a significant amount of vapor will be generated by boiling during cool-down. The condenser is required to have sufficient capacity to condense the vapor generated during cool-down as well as that encountered under operation of the engine. If the pump has the capability to circulate coolant during the cool-down phase the liquid coolant temperature can be maintained below the saturation temperature of the coolant and the amount of vapor seen by the condenser during cool-down will be sharply reduced.

I claim:

1. A process for cooling an internal combustion engine comprising the steps of mechanically pumping a boilable liquid coolant having a saturation temperature above about 132° C. at atmospheric pressure from the engine coolant jacket through a heat exchanger and back to the coolant jacket to provide heat rejection in the heat exchanger such that no vapor is formed in the liquid outside the coolant jacket as a result of the pressure drop induced by the pump and such that the temperature of the coolant within portions of the head portion of the coolant jacket that are in elevation above locations adjacent to combustion chamber domes and exhaust runners is maintained below the saturation temperature of the coolant at the system pressure, continuously removing from the engine coolant jacket by substantially unrestricted convection through at least one outlet leading from the highest region in the head portion of the coolant jacket substantially all gases other than gases that condense within the coolant in the jacket, including vapor formed by localized boiling of the liquid coolant in areas adjacent to combustion chamber domes and exhaust runners, whereby the major part of the head portion of the engine coolant jacket is kept filled with coolant in the liquid state at all times, conducting gases from the outlet to a condenser means that includes a condenser chamber, and returning the condensate from the condenser means to the coolant jacket.

2. The process claimed in claim 1 wherein the coolant consists essentially of at least one substance that is miscible with water and has a vapor pressure substantially less than that of water at any given temperature.

3. The process claimed in claim 2 wherein the substance of the coolant is selected from the group consisting of ethylene glycol, propylene glycol, tetrahydrofurfuryl alcohol, and dipropylene glycol.

4. The process claimed in claim 1 wherein the coolant consists essentially of at least one substance that is substantially immiscible with water and has a vapor pressure substantially less than that of water at any given temperature.

5. The process claimed in claim 4 wherein the substance of the coolant is selected from the group consisting of 2,2,4-trimethyl-1,3-pentanediol monoisobutyrate, dibutyl isopropanolamine, and 2-butyl octanol.

6. The process claimed in claim 1 wherein liquid coolant is circulated from the bore portion of the engine coolant jacket and returned to the head portion of the coolant jacket.

7. The process claimed in claim 1 wherein the liquid condensate is continuously returned from the condenser chamber to the coolant jacket by gravity.

8. The process claimed in claim 1 and further comprising the steps of conducting gases residing in the highest region of the condenser chamber to a recovery condenser that is vented to atmosphere and is in a location likely to be cooler than that of the condenser chamber for condensation of the condensable gases therein and returning the liquid condensate from the recovery condenser to the condenser chamber.

9. The process claimed in claim 8 and further comprising the steps of blocking the transfer of gases from the condenser chamber to the recovery condenser except when the pressure within the condenser chamber exceeds the pressure within the recovery condenser by a predetermined amount by means of a pressure relief valve placed between the condenser chamber and the recovery condenser, and blocking the transfer of condensate and gases from the recovery condenser to the condenser chamber except when the pressure within the recovery condenser plus any head pressure of the condensate exceeds the pressure within the condenser chamber by a predetermined amount by means of a second pressure relief valve placed between the condenser chamber and the recovery condenser.

10. The process claimed in claim 1 and further comprising the steps of conducting gases residing in the highest region of the condenser chamber through a vent to atmosphere when, and only when, the pressure within the condenser exceeds the ambient pressure by a predetermined amount, and conducting ambient air through the vent into the condenser when, but only when, the ambient pressure exceeds the pressure within the condenser by a predetermined amount.

11. Apparatus for cooling an internal combustion engine comprising a coolant jacket around at least part of each combustion chamber and exhaust runner of the engine and containing a boilable liquid coolant having a saturation temperature above 132° C. at atmospheric pressure, a liquid cooling circuit including a heat exchanger and mechanical pump means for circulating the coolant from the coolant jacket through the heat exchanger and back to the coolant jacket to provide heat rejection in the heat exchanger such that no vapor is formed in the liquid cooling circuit as a result of the pressure drop induced by the pump and such that the temperature of the coolant within portions of the head portion of the coolant jacket that are in elevation above locations adjacent to combustion chamber domes and exhaust runners are maintained below the saturation temperature of the coolant for the system pressure, at least one outlet from the highest region in the coolant jacket adapted to remove and release continuously by substantially unrestricted convection from the coolant jacket substantially all gases, including vapor formed by localized boiling of the liquid coolant in areas adjacent to combustion chamber domes and exhaust runners, other than gases that condense in the coolant within the jacket, whereby the major part of the coolant jacket in areas around combustion chamber domes and exhaust runners is kept filled with coolant in the liquid phase at all times, condenser means including a condenser chamber for receiving the gases removed and released from the coolant jacket through the outlet and condensing condensable constituents thereof, and return means for returning the condensate from the condenser means to the coolant jacket.

12. Apparatus according to claim 11 wherein the coolant consists essentially of at least one substance that is miscible with water and has a vapor pressure substantially less than that of water at any given temperature.

13. Apparatus according to claim 12 wherein the substance of the coolant is selected from the group consisting of ethylene glycol, propylene glycol, tetrahydrofurfuryl alcohol, and dipropylene glycol.

14. Apparatus according to claim 11 wherein the coolant consists essentially of at least one substance that is substantially immiscible with water and has a vapor pressure substantially less than that of water at any given temperature.

15. Apparatus according to claim 14 wherein the substance of the coolant is selected from the group consisting of 2,2,4-trimethyl-1,3-pentanediol monoisobutyrate, dibutyl isopropanolamine, and 2-butyl octanol.

16. Apparatus according to claim 11 wherein the liquid cooling circuit is adapted to circulate coolant from the block portion of the coolant jacket and return the liquid coolant to the head portion of the coolant jacket.

17. Apparatus according to claim 11 wherein the condenser chamber is located at an elevation higher than that of the outlet from the coolant jacket and the return means returns the condensate from the condenser chamber to the coolant jacket by gravity.

18. Apparatus according to claim 11 wherein the condenser chamber has a vent located in the highest region thereof and remote from the inlet thereto.

19. Apparatus according to claim 18 wherein the condenser means further includes a recovery condenser and a vent pipe connecting the vent of the condenser vessel and the recovery condenser and opening at generally the lowest portion of the recovery condenser, the recovery condenser being vented to atmosphere from the highest region thereof and being located in a location likely to be cooler than that of the condenser chamber, whereby when the pressure in the condenser chamber exceeds the pressure in the recovery condenser, gases residing in the highest region of the condenser chamber are conducted into the recovery condenser for condensaton of condensable gases therein and for venting of non-condensable gases, and condensate and gases that reside within the recovery condenser are conducted from the recovery condenser to the condenser chamber whenever the pressure within the recovery condenser exceeds the pressure within the condenser chamber plus the head pressure of the amount of condensate in the vent pipe.

20. Apparatus according to claim 19 and further comprising first pressure relief valve means located between the condenser chamber and the recovery condenser for blocking the passage of gases from the condenser chamber to the recovery condenser except when the pressure within the condenser chamber exceeds the pressure within the recovery condenser by a predetermined amount and second pressure relief valve means located between the condenser chamber and the recovery condenser for blocking the passage of condensate and gases from the recovery condenser to the condenser chamber except when the pressure within the recovery condenser exceeds the pressure within the condenser chamber plus the head pressure of the condensate in the vent pipe predetermined amount.

21. Apparatus according to claim 18 and further comprising outlet pressure relief valve means located at the vent for blocking the passage of gases from the condenser to atmosphere except when the pressure within the condenser chamber exceeds the ambient pressure by a predetermined amount and inlet pressure relief valve means located at the vent for blocking the passage of ambient air from atmosphere to the condenser chamber except when the ambient pressure exceeds the pressure within the condenser chamber by a predetermined amount.

* * * * *